(12) United States Patent
Normile

(10) Patent No.: US 6,687,782 B1
(45) Date of Patent: Feb. 3, 2004

(54) METHOD AND IMPLEMENTATION FOR ADDRESSING AND ACCESSING AN EXPANDED READ ONLY MEMORY (ROM)

(75) Inventor: James M. Normile, Hayward, CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 367 days.

(21) Appl. No.: 09/829,394

(22) Filed: Apr. 10, 2001

Related U.S. Application Data
(60) Provisional application No. 60/199,364, filed on Apr. 25, 2000.

(51) Int. Cl.$^7$ ................................................ G06F 12/00
(52) U.S. Cl. ......................... 711/2; 711/217; 711/218; 711/219; 711/220; 710/29
(58) Field of Search .................. 711/2, 5, 102, 711/202, 212, 217–220; 701/29–35; 710/14, 34

(56) References Cited

U.S. PATENT DOCUMENTS

| | | | |
|---|---|---|---|
| 3,818,460 A | * 6/1974 | Beard et al. ................ 711/2 |
| 4,113,980 A | 9/1978 | Bell ............................ 174/52 |
| 4,777,355 A | * 10/1988 | Takahira ...................... 235/380 |
| 4,831,522 A | * 5/1989 | Henderson et al. ............ 711/2 |
| 4,987,537 A | * 1/1991 | Kawata ....................... 711/212 |
| 5,030,129 A | 7/1991 | Koch .......................... 439/374 |
| 5,155,826 A | * 10/1992 | Fadem ........................ 711/209 |
| 5,226,136 A | * 7/1993 | Nakagawa .................... 463/44 |
| 5,341,484 A | * 8/1994 | Tanaka et al. ............... 709/100 |
| 5,386,537 A | * 1/1995 | Asano ........................ 711/157 |
| 5,541,840 A | 7/1996 | Gurne et al. ............ 364/424.03 |
| 5,561,331 A | 10/1996 | Suyama et al. ............. 307/10.3 |
| 5,577,221 A | * 11/1996 | Liu et al. .................... 711/100 |
| 5,606,680 A | * 2/1997 | Parvereshi et al. .......... 711/200 |
| 5,758,300 A | 5/1998 | Abe ............................ 701/33 |
| 5,835,926 A | * 11/1998 | Pesuit .......................... 711/1 |
| 5,860,139 A | * 1/1999 | Martin ........................ 711/202 |
| 5,875,413 A | 2/1999 | Vinci ........................... 702/91 |
| 5,898,162 A | 4/1999 | Koenck et al. ............. 235/472 |
| 5,916,286 A | * 6/1999 | Seashore et al. ............ 701/29 |
| 5,993,743 A | 11/1999 | Nordman et al. ............ 422/94 |
| 6,032,234 A | * 2/2000 | Kishi ......................... 711/156 |
| 6,049,852 A | * 4/2000 | Oba et al. ................... 711/145 |
| 6,081,881 A | * 6/2000 | Johnson et al. ............. 711/220 |
| 6,154,805 A | * 11/2000 | Parvereshi et al. ............ 711/2 |

FOREIGN PATENT DOCUMENTS
EP 0754940 1/1997

OTHER PUBLICATIONS
Patent Abstracts of Japan, Publication No. 03001672, Publication dated Aug. 1, 1991.

* cited by examiner

Primary Examiner—Hong Kim
(74) Attorney, Agent, or Firm—McDermott, Will & Emery

(57) ABSTRACT

A ROM is provided with sufficient input address terminals for receipt of a unique address for each data storage location, even though the number of ROM input addresses exceeds the capacity of the processor and address bus. A dual mode read operation includes a random address mode for randomly accessing the ROM and a sequential address mode for accessing sequentially stored data strings at a high access rate. A first portion of the bus addresses are allocated as random reading mode bus addresses, the bus addresses having direct correspondence with ROM addresses. Other bus addresses are allocated as sequential reading mode bus addresses for addressing the ROM in sequential ROM address order for reading data. Successive output by the processor of the same sequential reading mode bus address effects application to the ROM of sequentially numbered ROM addresses. The first numbered address of the plurality of the sequential ROM address string is loaded as data into at least one counter. Processor output of the sequential reading mode address effectuates application of the contents of the counter as an address to the ROM and increments the counter so that a successive output of the same address by the processor causes the incremented address to be applied to the ROM. This arrangement has particular applicability in vehicle diagnostics equipment.

31 Claims, 3 Drawing Sheets

METHOD AND IMPLEMENTATION FOR ADDRESSING AND ACCESSING AN EXPANDED READ ONLY MEMORY (ROM)

CROSS-REFERENCE TO RELATED APPLICATIONS

This application claims priority from U.S. Provisional Application No. 60/199,364 filed Apr. 25, 2000, which is incorporated herein by reference.

FIELD OF THE INVENTION

The present invention relates to addressing and accessing a ROM in a data processing system. More particularly, the invention facilitates addressing a ROM having a number of storage addresses greater than the address output capacity of a processor and its coupled address bus. The invention has particular, but not exclusive, applicability to the field of vehicle diagnostics equipment.

BACKGROUND

Read Only Memories (ROMs) traditionally have been used in data processing systems for storing executable code. Accessing such data from the ROM permits the processor to perform its own operating functions as well as to interact with various peripheral devices. Executable code stored in ROM also can be used by the processor to perform any of various applications to which the system may be dedicated. ROM data typically are permanently stored to be accessed as needed in accordance with read enable and address signals output by the processor. ROM data are not normally overwritten or erased. In contrast, data generated by the processor are stored temporarily in random access memory for further manipulation by the processor or for storage in a more permanent storage medium, such as magnetic or optical disc or tape.

A simplified block diagram of a conventional processor-ROM arrangement is shown in FIG. 1. Processor 10 has a plurality of address output terminals $A_0$–$A_n$ at for outputting an address signal to address bus 12 for accessing data in the ROM 20. Address signals are received at the address bus input of the ROM and fed to ROM address decoder 22. The address decoder identifies that portion of the ROM data storage to be accessed in accordance with the received address. Data are accessed in response to a read enable signal generated by the processor, received at an appropriate input of the ROM (not illustrated). The accessed data are output to data bus 14, which is connected to data input terminals $D_0$–$D_m$ at the processor. The address bus and data bus each contain a number of individual lines equal, respectively, to the number of processor terminals to which it is connected. Each line carries a single bit signal. Data are typically accessed in eight bit (one byte) increments, each ROM address identifying a byte of data storage. Data bus 14 thus is made up of eight lines connected to eight data terminals at the processor.

The number of lines in address bus 12 limits the number of addresses that can be applied to ROM 20 and thus conventionally is correlated to the storage capacity of the ROM. For example, if ROM 20 contains one megabyte of storage, an address bus of at least twenty bits would be needed to directly address and access the entire storage. If address bus 12 and processor address terminals provide a fewer number of bits, for example, a sixteen bit bus, only a fraction of the ROM storage capacity can be directly accessed from the addresses received at the ROM input from the address bus. To accommodate full usage of the ROM, modification of the internal ROM control circuit would be necessary so that an address received from the address bus can be used to appropriately identify one of a plurality of storage locations assigned to the address. In addition to the circuit complexity introduced by such accommodation, modification of the processor would be required to provide appropriate control signals for operation in a plurality of address modes. Loss of operating speed is an additional negative byproduct.

Design of a system can take into account the size of the ROM component and match the address bus to permit direct access to all ROM data storage locations, as in the above described example of providing a twenty bit address bus for a one megabyte ROM. As technology evolves and develops, however, the need for increased ROM storage capacity, beyond the capacity of the address bus of an existing system becomes more commonplace. Factors such as development of new applications and upgrades of original applications for the system may dictate a requirement for ROM expansion.

For example, the system may be part of a dedicated diagnostic device in which such new applications and upgrades are furnished with additional ROM executable code, for use such as in vehicle diagnostics. Computerized units for engine analysis, wheel alignment, etc., are provided with inputs coupled from a vehicle, as well as user input. Such units include displays for waveforms and other graphical representation of measured vehicle parameters. These units may be linked with portable computerized devices for use by technicians. Diagnostic applications are appended with detailed text explanation and graphic information, such as pictorial diagrams, for display at a system monitor. Stored text messages for display may include instructions for set up and use of the instrument, a compilation of help messages, etc. The text and graphic information is represented by extensive strings of data in ROM storage for recurrent access in dependence upon the application context. Typically, as applications are further refined, data are added thereafter. While the original one megabyte ROM chip can be replaced with one or more updated ROM chips and appended with additional ROM chips for text and graphic storage, replacement of the address bus and modification of the processor is not usually a practicable matter.

With the number of ROM address inputs limited to the size of the processor address bus, various methods have been employed, alluded to above, for mapping an address received at the ROM input to one of a plurality of ROM storage locations. A conventional approach is memory page switching, with attendant disadvantages of added ROM control circuit complexity, processor operation modifications, and loss of access speed.

The need thus exists for directly accessing ROM storage locations in which the cumulative number of addresses, and thus the number of ROM address input terminals, exceeds the address capacity of the processor and address bus. Such a solution should provide advantages with respect to the conventional arrangements with respect to circuit modification complexities and access speed.

SUMMARY OF THE INVENTION

The present invention fulfills the aforementioned needs. An advantage of the present invention is that a ROM is provided with sufficient input address terminals for receipt of a unique address for each data storage location, even though the number of ROM input addresses exceeds the capacity of the processor and address bus.

An additional advantage of the present invention is that a dual mode of ROM read address operations is provided without modification of ROM circuitry for accessing address locations greater in number than the capacity of the address bus. This aspect of the invention offers the further advantage of providing a random address mode for randomly accessing the ROM and a sequential address mode for accessing sequentially stored data strings at a high access rate.

These and other advantages are satisfied, at least in part, by allocating bus addresses to each of the modes in the following manner. A first portion of the bus addresses is allocated as random reading mode bus addresses for randomly addressing the ROM for reading data, the bus addresses having direct correspondence with ROM addresses. Other bus addresses are allocated as sequential reading mode bus addresses for addressing the ROM in sequential ROM address order for reading data. Successive output by the processor of the same sequential reading mode bus address effects application to the ROM of sequentially numbered ROM addresses. In this manner a data stream can be accessed from the ROM at a high speed. The first numbered address of the plurality of the sequential ROM address string is loaded as data into at least one counter. Processor output of the sequential reading mode address effectuates application of the contents of the counter as an address to the ROM and increments the counter so that a successive output of the same address by the processor effectuates application of the incremented counter contents as an address to the ROM.

The first address of the string is loaded into the counter in response to generation of a write enable signal by the processor and output to the address bus of the sequential reading mode bus address. A decoder, having an input connected to the address bus and an output connected to the counter, is set to identify the associated sequential mode address at the address bus. Detection of the sequential mode address results in application of an activation signal from the decoder to the counter for loading the address data from the processor via the data bus to the counter input. The counter may comprise a plurality of interconnected stages, each loaded with data representing a portion of the address, whereby the aggregate number of bits carried by the counter is made equal to the number of ROM address bits and exceeds the number of processor address bus bits. Each stage of the counter may be linked with a separate decoder and thus individually loaded in response to output to the processor address bus of a respective one of the sequential reading mode bus addresses.

In both the random access mode and the sequential mode, addresses are applied to ROM address input terminals by a multiplexer having a number of output terminals equal to the number of ROM address input terminals. The multiplexer has input terminals connected to the address bus and each of the counter stages. The decoder provides detection of the mode of reading operation on the basis of whether the address output by the processor can be decoded to produce a change in output state of the decoder. Through appropriate logic circuitry connected to the decoder, a read control signal, indicative of the mode of reading operation, is applied to the multiplexer to apply the received bus address signal as a ROM address to the ROM in the random access reading mode or the outputs of the decoder stages as a ROM address to the ROM in the sequential access reading mode.

Additional advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The drawing figures depict the present invention by way of example, not by way of limitation. In the figures, like reference numerals refer to the same or similar elements.

DETAILED DESCRIPTION OF THE PREFERRED EMBODIMENT

Figure 1:
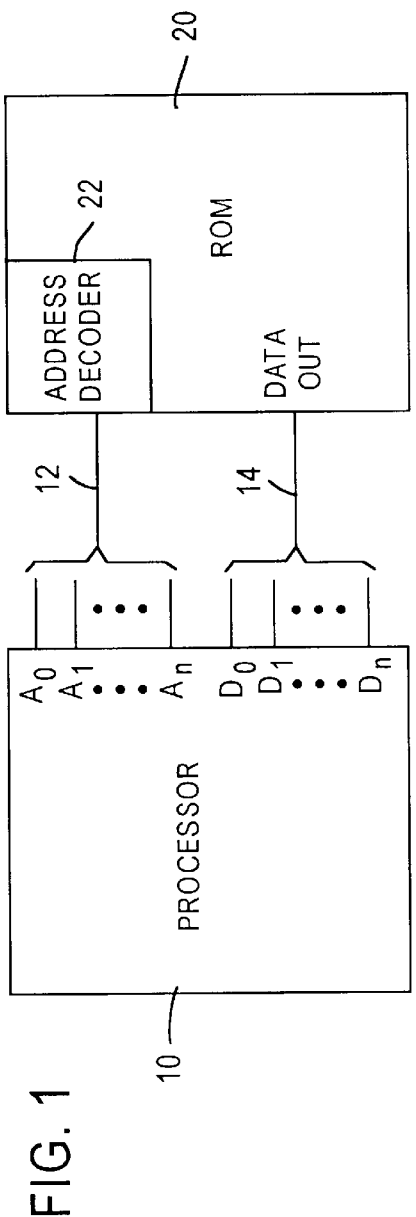
FIG. 1 is a simplified block diagram of a conventional processor-ROM arrangement.
Figure 2:
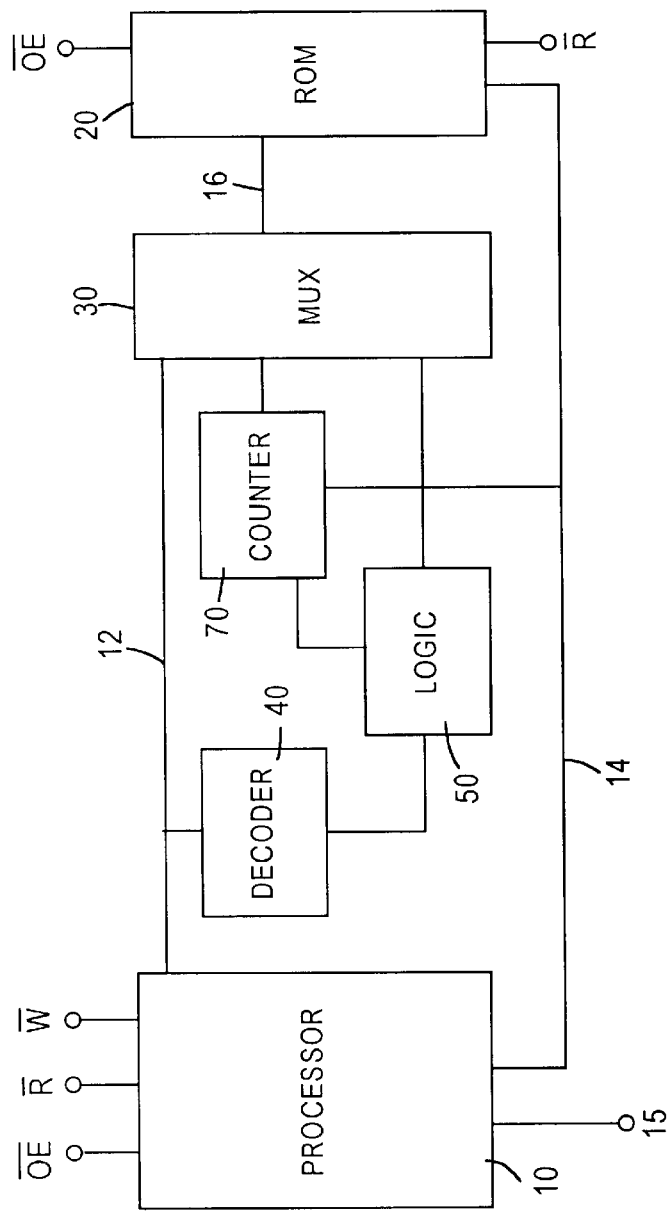
FIG. 2 is a simplified block diagram of a ROM address arrangement in accordance with the present invention.

FIG. 2 is a simplified block diagram of the ROM address arrangement of the present invention. Address output terminals of processor 10 are connected to processor address bus 12, which are coupled to one input of multiplexer 30. The output of multiplexer 30 feeds ROM address signals to ROM 20 via ROM address bus 16. The bit width of the ROM address input, ROM bus address, and multiplexer output are the same and in excess of the bit width of the processor address bus 12. The maximum number of ROM addresses thus exceeds the address capacity of the processor address bus. Merely by way of example, a 16 bit processor address bus would have an address capacity in excess of 64 kbytes of memory, while a 24 bit ROM address bus would have an address capacity in excess of 16 Mbytes of memory.

Data bus 14 is connected between the ROM and the processor for conveying data accessed from the ROM to the processor and for loading data from the processor to counter 70. The bit width of the data bus is significantly smaller than the bit width of the ROM access bus. Each time that the ROM is addressed in a read mode, data equal in number to the data bus bit width is accessed. Processor address bus 12 is also connected to the input of decoder circuit 40, the output of which is connected to logic circuit 50. Logic circuit 50 is connected to counter 70 for actuation and control of the counter. Counter 70 has an input connected to data bus 14 and an output connected to another input of multiplexer 30. The contents of the counter contain the same number of bits as the ROM address bus. Logic circuit 50 is also connected the multiplexer 30 for applying a control signal thereto. Logic circuit 50 has inputs for receiving signals such as read enable and write enable signals from the processor 10. These inputs are not shown for simplicity of illustration.

In a ROM read operation, the processor outputs an address to address bus 12, which applies the address to both multiplexer 30 and decoder 40. As to be more fully explained below, decoder 40 has been set to a specific address that is associated with a sequential access mode of read operation. If the address output by the processor is the specific decoder address, the decoder outputs an enable signal to the logic circuit 50. In response, the logic circuit applies a read control signal to the multiplexer 30 that is indicative of the sequential access mode. The multiplexer thereupon applies the contents of counter 70 to the ROM address bus. Logic circuit 50 contains a pulse delay circuit for thereafter applying a clock signal to the counter to increment the counter contents. Subsequent output of the same specific address by the processor will be acted upon by the decoder, logic circuit, counter and multiplexer in the same manner to output the incremented counter contents, i.e., the next sequential ROM address, to the ROM. Successive output of the sequential mode address enables high speed data access.

Output of a random mode address by the processor does not match the decoder and the sequential access mode is not initiated. As no enable signal is generated by the decoder, the multiplexer is set to the random access mode of operation. The processor address output is applied by the multiplexer from the processor address bus to the ROM address bus. In order to accommodate the greater number of multiplexer output lines that match the bit width of the ROM address bus, the number of multiplexer output bit lines in excess of the number of processor address bus lines are tied to either a binary high or low state, depending on design considerations. Preferably, the excess lines can be at the high end or low end of the ROM address, although other terminal groupings can be tied if beneficial to a particular application.

In system operation, the processor is responsive to an input signal, received at a terminal 15, for implementing one of the modes of ROM access. In a vehicle diagnostics device, the signal may be developed manually or automatically in response to vehicle parameter conditions. For example, in a diagnostic procedure, the sequential ROM storage may include textual explanation for each of a plurality of possible conditions to aid the operator in performing the diagnostic service. Upon occurrence of a condition, a signal may be applied to input 15 for accessing the relevant sequential string of data, the information for which can then be displayed for the operator. Alternatively, the operator may issue a command signal to access the sequential ROM storage to display explanatory text and/or graphics for reference purposes. While input 15 is illustrated as a single input for purposes of simplifying explanation, it should be realized that diagnostic applications are varied and that any number of interfacing connections may be made with the processor as appropriate to the particular application.

Figure 3:
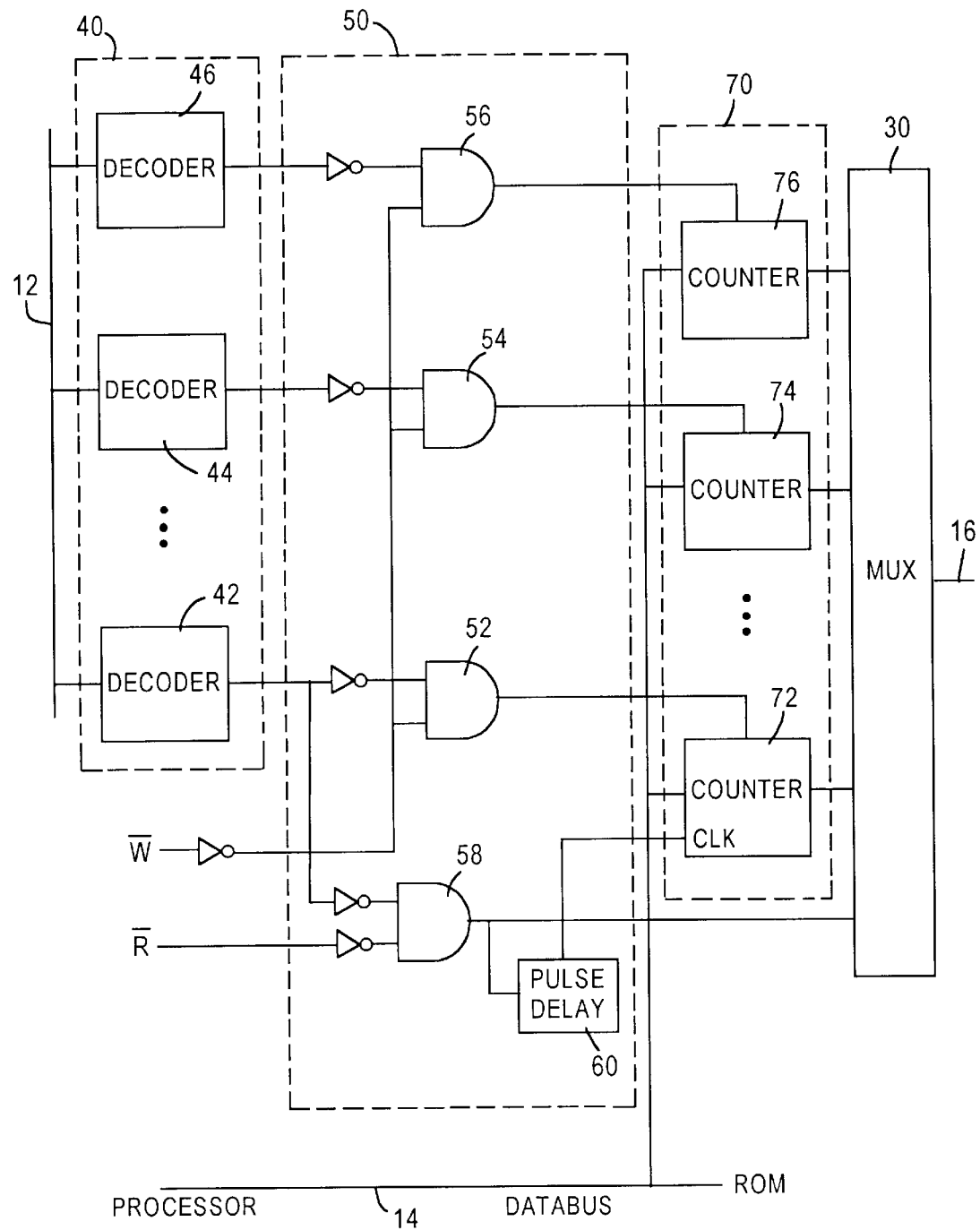
FIG. 3 is a more detailed block diagram of the sequential read mode elements in accordance with the present invention.

FIG. 3 is a more detailed block diagram of the sequential read mode elements in accordance with the present invention. In the sequential mode, the contents of counter 70 are applied by the multiplexer 30 to the ROM address bus. The total number of counter output bits thus is equal to the bit width of the ROM address bus. Data representing the first ROM address of a sequence of ROM addresses are written into the counter from the data bus 14. The writing operation is initiated in response to a write enable signal $\overline{W}$ output by the processor. The counter 70 may comprise any well known specific counter arrangement. In the preferred embodiment shown, the counter comprises a plurality of interconnected stages 72, 74 76, each having a bit width equal to the bit width of the data bus. The term "counter" as used herein is intended to likewise include a plurality of counter stages. To accommodate a complete ROM address, the number of counter stages is equal to the ROM address bit width divided by the data bus bit width. Three counter stages are illustrated to correspond to the above described example of a twenty four bit width ROM and an eight bit width data bus. While the bit width of the data bus typically may be one byte, design considerations for particular applications may indicate a different size.

Decoder 46 comprises a plurality of decoder stages 42, 44 and 46, each corresponding to a respective counter stage. The term "decoder" as use herein is intended to likewise include a plurality of decoder stages. Logic circuit 50 comprises a plurality of logic elements connected as follows. AND gate 52 has a first input connected through an inverter to decoder stage 42. AND gate 54 has a first input connected through an inverter to decoder stage 44. AND gate 56 has a first input connected through an inverter to decoder stage 46. A second input of each of the AND gates is connected through an inverter to the write enable line of the processor. The output of AND gate 52 is connected to counter stage 72. The output of AND gate 54 is connected to counter stage 74. The output of AND gate 56 is connected to counter stage 76. AND gate 58 has a first input connected through an inverter to the output of decoder stage 42 and a second input connected through an inverter to the read enable signal line. The output of AND gate 58 is connected to the multiplexer. Pulse delay circuit 60 is connected between the output of AND gate 58 and the multiplexer.

Each counter stage is activated in response to a signal received through logic circuit 50 and decoder 40. Counter stage 72 is activated in response to a signal received from its connection to AND gate 52. Counter stage 74 is activated in response to a signal received from its connection to AND gate 54. Counter stage 76 is activated in response to a signal received from its connection to AND gate 56. Each decoder stage is connected to the address bus and is set to a unique one of the sequential mode addresses.

In the write operation, the first sequential ROM address is loaded into each counter stage in a succession of write commands from the processor. The processor generates a write enable signal and applies a sequential mode address to the address bus. For an address that matches decoder stage 42, the decoder outputs an enable signal. AND gate 52, having high level signals at the decoder input and the write enable input, outputs a signal to activate counter stage 72. One byte of data, representing one third of the first sequential ROM address is output by the processor to the data bus and loaded into the activated counter stage 72. Data are loaded in the same manner to counter stages 74 and 76. The address for each decoder is output and the appropriate data loaded from the data bus. During the write operation the ROM is inactive as there is neither a read enable signal nor output enable signal output by the processor. Thus no stored ROM data can be overwritten.

The read operation is initiated by generation of a read enable pulse signal by the processor. For the sequential read mode, the processor outputs the address to which decoder 42 is set to produce an output signal from the decoder. AND gate 58, in response to the decoder output signal and read enable signal at its inputs outputs a read control signal to the multiplexer. The multiplexer switches the counter contents received from the counter input to the ROM address bus. The first sequential ROM address is thereby input to the ROM. As the read enable signal is also applied to the ROM, in a manner well known in the art, a byte of data identified by the applied ROM address is output to the data bus. The read enable pulse, conveyed through AND gate 58, is delayed by pulse delay circuit 60 for a period sufficient for the data to be accessed and then applied to a clk input of counter stage 72 to increment the counter stage. This operation is repeated for each successive output by the processor of the same address. In a manner well known in the art, all counter stages may be tied together so that, when the maximum count is reached by counter stage 72 (taken as the least significant byte), after the next read a carry signal is applied to increment the next counter stage while counter stage 72 rolls to zero. It is to be understood, also, that the address for decoder stage 42 is exemplified as the sequential mode address for simplicity of illustration and description. Any of the other decoder stage addresses may be so utilized for the read mode sequence. As a further alternative, each of the decoder stages may be connected through appropriate logic circuitry to activate the sequential read operation in response to output by the processor of its corresponding address.

In random access mode, the number of output lines (16) exceeds the width of the processor address bus (12). The multiplexer (30) input lines for the random access mode in excess of the number of processor address lines (12) are tied to fixed logic levels presenting sufficient input lines for each mix stage. In the random access read mode, an address is output by the processor that does not match any of the decoder stage addresses. While a read enable signal is also generated, gate 58 does not receive an output from a decoder stage and thus does not switch states. The multiplexer, therefore, will not switch its output from the process address bus to the counters. As the read enable pulse signal is not conveyed to the pulse delay circuit, no incrementation of the counter occurs.

Figure 4:
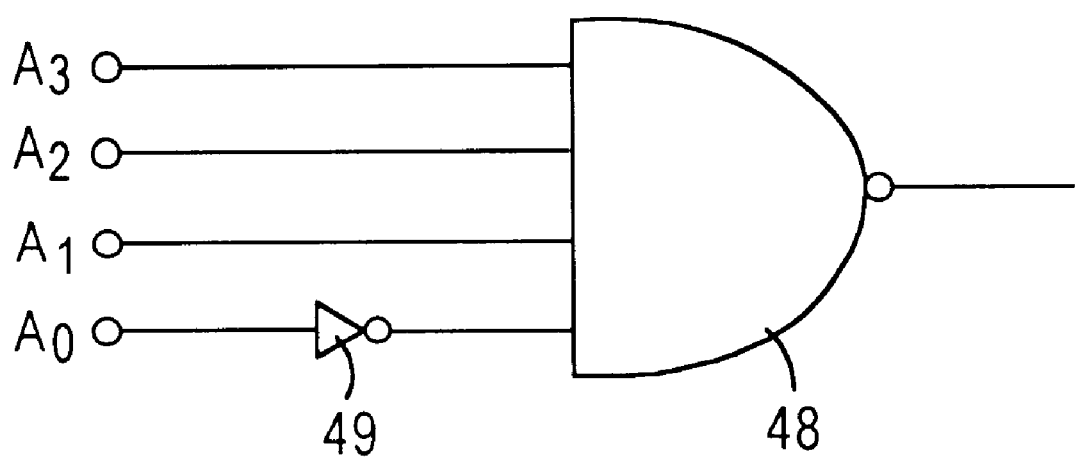
FIG. 4 is a diagram illustrative of a decoder in accordance with the present invention.

The illustrated address decoder may comprise any decoder well known in the art. A preferred arrangement is illustrated in FIG. 4. For ease of illustration and explanation, a four bit input is represented. It is to be understood that, for the 16 bit address bus example of FIG. 3 or any other bit width input, the decoder stage is appropriately expanded. Decoder 48 comprises a NAND gate having four input terminals connected to lines $A_0$–$A_3$, which may correspond to individual address bit lines. When all input terminals are at a high level the NAND gate outputs a low level signal. All of the input terminals of the gate can be set, or programmed, to be at a high level for any one of the sixteen possible combinations of inputs at lines $A_0$–$A_3$, by connecting one or more inverters at appropriate input terminals. In the illustration, inverter 49 is connected in the least significant bit line, while the remaining input lines are directly connected to the NAND gate inputs. An address of 1-1-1-0, a hexidecimal value E, would result in all NAND input gates attaining a high level and an output signal of a change state (low). For any of the other fifteen possible input addresses, at least one of the gate inputs would be at a low level and the output of the gate, thus, at a high level. The illustrated arrangement is thus a decoder for hexidecimal E. The NAND gate has been illustrated for correspondence with the negative level logic described for the embodiment of FIG. 3. As would be appreciated by one of ordinary skill in the art, positive logic can be used without changing the spirit of the invention. With this alternative, the NAND gate would be replaced with an appropriate AND gate.

While the foregoing has described what are considered to be preferred embodiments of the invention it is understood that various modifications may be made therein and that the invention may be implemented in various forms and embodiments, and that it may be applied in numerous applications, only some of which have been described herein. For example, the described embodiment of FIG. 3 permits a string of ROM data to be read in sequential manner in response to successive outputs of a single address by the processor. It should be understood that a plurality of ROM data portions can be defined for such sequential operation. For any such sequential string of ROM data the same combination of counters and decoders can be used. The decoder starting address, loaded into the counters, for each string can be set to a respective one of a plurality of ROM addresses to activate the sequential reading mode as well as to load the respective counter. Each counter is output to a respective multiplexer input. Through the use of appropriate logic circuitry, in accordance with a decoder output the appropriate counter output can be applied by the multiplexer to the ROM bus address.

It is further within the contemplation of the present invention that the ROM consist of EEPROM storage wherein data may be written to the memory. The dual random address mode/sequential address mode operation disclosed herein may be utilized for writing to memory having a greater number of address locations than the processor address bus bit width limit. Decoders and counters may be correlated in the same manner to identify the expanded number of addresses to the ROM address bus.

The described preferred embodiments employ a plurality of decoder stages and counter stages. The plurality of counter stages can be replaced by an appropriately connected single counter stage. Likewise, a single decoder may be employed with appropriate logic interconnections to the counter to successively load data to the counter.

It is intended by the following claims to claim all such modifications and variations which fall within the true scope of the invention.

What is claimed is:

1. In a data processing system comprising a processor having a total number of address output terminals and an address bus having a bit width corresponding to a finite address capacity, the bit width equal in number to the total number of processor address output terminals, the processor coupled to a Read Only Memory (ROM) via the address bus for output of bus addresses corresponding to ROM data storage locations, the ROM having a number of addresses greater than the finite address capacity of the address bus, the processor coupled to the ROM via a data bus for receiving from the ROM stored data identified by the ROM addresses, a method for expanding the number of accessible ROM addresses beyond the finite address bus capacity, said method comprising the steps of:

allocating a first portion of the bus addresses as random reading mode bus addresses for randomly addressing the ROM for reading data, the random reading mode bus addresses having direct correspondence with ROM addresses;

allocating a second portion of bus addresses as sequential reading mode bus addresses for addressing the ROM in sequential ROM address order for reading data;

associating at least one of the sequential reading mode bus addresses with a plurality of sequentially numbered ROM addresses; and loading the first numbered address of the plurality of sequentially numbered ROM addresses as data into at least one counter;

wherein processor output of the associated sequential reading mode address effectuates application of the contents of the counter as an address to the ROM and increments the counter.

2. A method as recited in claim 1, wherein successive outputs of the associated sequential reading mode address accesses the plurality of sequentially numbered ROM addresses in sequential order in accordance with incremented counter contents.

3. A method as recited in claim 2, wherein the data processing system provides vehicle diagnostic analysis and the ROM data storage represented by the plurality of sequentially numbered ROM addresses comprises a string of text information.

4. A method as recited in claim 2, wherein the data processing system provides vehicle diagnostic analysis and the ROM data storage represented by the plurality of sequentially numbered ROM addresses comprises graphical data.

5. A method as recited in claim 1, wherein the step of associating comprises
setting a decoder, having an input connected to the address bus and an output coupled to the counter, to identify output of the associated sequential mode address to the address bus.

6. A method as recited in claim 1, wherein the processing system comprises a plurality of counters and the step of loading comprises distributing the data representing the first sequentially numbered ROM address among the plurality of counters.

7. A method as recited in claim 6, further comprising the step of:
relating a plurality of the sequential reading mode bus addresses to respective counters;
and said loading step comprises applying a portion of the first numbered address of the plurality of sequentially numbered ROM addresses to each of the counters.

8. A method as recited in claim 7, wherein said step of relating comprises, for each of said plurality of sequential reading mode bus addresses, setting a respective decoder, coupled between the address bus and a respective counter, for identifying output of the associated sequential mode address to the address bus.

9. In a data processing system comprising a processor coupled to a Read Only Memory (ROM) via an address bus for output of bus addresses corresponding to ROM data storage locations, the ROM having a number of addresses greater than the finite address capacity of the address bus, the processor coupled to the ROM via a data bus for receiving from the ROM stored data identified by the ROM addresses, a method for expanding the number of accessible ROM addresses beyond the finite address bus capacity said method comprising the steps of:
allocating a first portion of the bus addresses as random reading mode bus addresses for randomly addressing the ROM for reading data, the random reading mode bus addresses having direct correspondence with ROM addresses;
allocating a second portion of bus addresses as sequential reading mode bus addresses for addressing the ROM in sequential ROM address order for reading data;
associating at least one of the sequential reading mode bus addresses with a plurality of sequentially numbered ROM addresses; and
loading the first numbered address of the plurality of sequentially numbered ROM addresses as data into at least one counter;
wherein processor output of the associated sequential reading mode address effectuates application of the contents of the counter as an address to the ROM and increments the counter;
wherein the loading step comprises:
generating a write enable signal;
outputting, to the address bus, the sequential reading mode bus address associated with the counter;
outputting, as data to the data bus, the first numbered address of the plurality of sequentially numbered ROM addresses; and
writing the data output as contents to the at least one counter.

10. In a data processing system comprising a processor having a total number of address output terminals and an address bus having a bit width corresponding to a finite address capacity, the bit width equal in number to the total number of processor address output terminals, the processor coupled to a Read Only Memory (ROM) via the address bus, the ROM having an address capacity greater than the address capacity of the address bus, a method for addressing the ROM comprising a random address mode in which the processor outputs a first address that directly corresponds to a ROM address and a sequential address mode in which the processor outputs a second address that corresponds to a plurality of ROM addresses, the method comprising the steps of:
in response to output by the processor of the first address, applying the first address as an address to the ROM in the random address mode; and
in response to output by the processor of the second address, applying a counter output as an address to the ROM in the sequential address mode.

11. A method as recited in claim 10, wherein the data processing system provides vehicle diagnostic analysis and ROM data storage represented by a plurality of sequentially numbered ROM addresses for the sequential address mode comprises a string of text information.

12. A method as recited in claim 10, wherein the data processing system provides vehicle diagnostic analysis and the ROM data storage represented by a plurality of sequentially numbered ROM addresses for the sequential address mode comprises graphical data.

13. A method as recited in claim 10, further comprising the steps of:
incrementing the counter after the step of applying the counter output; and
in response to a subsequent output of the second address by the processor, applying the incremented counter output as an address to the ROM.

14. A method as recited in claim 13, wherein the plurality of ROM addresses in the sequential address mode corresponds to a related string of data for access in response to successive output of the second address by the processor.

15. In a data processing system comprising a processor coupled to a Read Only Memory (ROM) via an address bus, the ROM having an address capacity greater than the address capacity of the address bus, a method for addressing the ROM comprising a random address mode in which the processor outputs a first address that directly corresponds to a ROM address and a sequential address mode in which the processor outputs a second address that corresponds to a plurality of ROM addresses, the method comprising the steps of:
in response to output by the processor of the first address, applying the first address as an address to the ROM in the random address mode; and
in response to output by the processor of the second address, applying a counter output as an address to the ROM in the sequential address mode;
wherein the counter comprises a plurality of interconnected counter stages and each of a plurality of unique processor output addresses is related respectively to one of the counter stages, and said sequential access mode further comprises:
decoding a generated output from the processor of one of the unique processor output addresses;

in response to the decoding step, applying the contents of all of the counter stages as an address to the ROM; and incrementing the counter.

16. A method as recited in claim 15, comprising repeating said decoding, applying an incrementing steps upon successive generation by the processor of the unique processor output address.

17. In a data processing system comprising a processor having a total number of address output terminals and an address bus having a bit width corresponding to a finite address capacity, the bit width equal in number to the total number of processor address output terminals, the processor coupled to a Read Only Memory (ROM) via an address bus, the ROM having an address capacity greater than the address capacity of the address bus, a method for addressing the ROM comprising a random address mode in which the processor outputs a first address that directly corresponds to a ROM address and a sequential address mode in which the processor outputs a second address that corresponds to a plurality of ROM addresses, the method comprising the steps of:

applying an address output by the processor to a decoder to determine whether the sequential address operational mode or the random address operational mode is identified;

in response to identification of the sequential address operational mode in the applying step, activating a counter associated with the decoded output to apply the contents of the counter as a ROM address; and in response to identification of the random address operational mode in the applying step, applying the address output by the processor as a ROM address.

18. A method as recited in claim 17, wherein the data processing system provides vehicle diagnostic analysis and ROM data storage represented by a plurality of sequentially numbered ROM addresses for the sequential address operational mode comprises a string of text information.

19. A method as recited in claim 17, wherein the data processing system provides vehicle diagnostic analysis and the ROM data storage represented by a plurality of sequentially numbered ROM addresses for the sequential address operational mode comprises graphical data.

20. A method as recited in claim 17, wherein each applied ROM address is coupled to the ROM via a multiplexer, and further comprising the step of applying an operational mode signal to said multiplexer in dependence upon the decoded output in the applying step; wherein the multiplexer transfers either the address output by the processor or the contents of the counter as an address to the ROM in accordance with the operational mode signal.

21. In a data processing system comprising a processor coupled to a Read Only Memory (ROM) via an address bus, the ROM having an address capacity greater than the address capacity of the address bus, a method for addressing the ROM comprising a random address mode in which the processor outputs a first address that directly corresponds to a ROM address and a sequential address mode in which the processor outputs a second address that corresponds to a plurality of ROM addresses, the method comprising the steps of:

applying an address output by the processor to a decoder to determine whether the sequential address operational mode or the random address operational mode is identified;

in response to identification of the sequential address operational mode in the applying step, activating a counter associated with the decoded output to apply the contents of the counter as a ROM address; and in response to identification of the random address operational mode in the applying step, applying the address output by the processor as a ROM address;

wherein the counter comprises a plurality of interconnected counter stages, each counter stage having an output connected to the multiplexer, and the step of applying comprises:

coupling the address output by the processor to a plurality of decoders, each decoder associated with a respective one of the counter stages; and in response to determination of a sequential address operational mode by one of the decoders, applying the contents of all of the counter stages as ROM address to the ROM through the multiplexer.

22. A method as recited in claim 21, further comprising the steps of:

in response to successive processor outputs of an address indicative of the sequential address operational mode by a decoder output, successively applying the contents of the counter associated therewith as a ROM address; and incrementing the associated counter after each application of its contents as a ROM address.

23. A data processing system for addressing an expanded Read Only Memory (ROM) to access data stored therein in either a random address access mode or a sequential address access mode, said system comprising:

a processor connected to the ROM by a data bus, the processor having, a total number of address output terminals;

an address bus connected to the processor for output therefrom of addresses corresponding to stored ROM data to be accessed, the address bus having a bit width equal in number to the total number of processor address output terminals, the processor and address bus having a smaller bus address output capacity than the number of addresses in the ROM;

a multiplexer having a plurality of inputs, a first multiplexer input connected to the address bus, and a multiplexer output connected to the ROM to apply ROM addresses thereto; and a decoder having an input connected to the address bus and an output coupled to a counter, the counter having an output connected to a second input of the multiplexer;

wherein the multiplexer is responsive to an output signal of the decoder indicative of the sequential address access mode to apply the counter output to the multiplexer output as a ROM address and, in the absence of the decoder output signal, to preclude application of counter output to the ROM.

24. A data processing system as recited in claim 23, wherein the data processing system provides vehicle diagnostic analysis and ROM data storage represented by a plurality of sequentially numbered ROM addresses for the sequential address mode comprises a string of text information.

25. A data processing system as recited in claim 23, wherein the data processing system provides vehicle diagnostic analysis and ROM data storage represented by a plurality of sequentially numbered ROM addresses for the sequential address mode comprises graphical data.

26. A data processing system as recited in claim 23, wherein the counter is connected to the data bus for writing therein one of said ROM addresses.

27. A data processing system as recited in claim 23, wherein said decoder comprises a logic gate having a number of inputs equal to the number of bus address bit output capacity, the decoder inputs connected to respective inverters in accordance with a predetermined sequential address access mode bus address.

28. A data processing system for addressing an expanded Read Only Memory (ROM) to access data stored therein in either a random address access mode or a sequential address access mode, said system comprising:

a processor connected to the ROM by a data bus;

an address bus connected to the processor for output therefrom of addresses corresponding to stored ROM data to be accessed, the processor and address bus having a smaller bus address output capacity than the number of addresses in the ROM;

a multiplexer having a plurality of inputs, a first multiplexer input connected to the address bus, and a multiplexer output connected to the ROM to apply ROM addresses thereto; and a decoder having an input connected to the address bus and an output coupled to a counter, the counter having an output connected to a second input of the multiplexer;

wherein the multiplexer is responsive to an output signal of the decoder indicative of the sequential address access mode to apply the counter output to the multiplexer output as a ROM address and, in the absence of the decoder output signal, to preclude application of counter output to the ROM; and wherein the counter comprises a plurality of interconnected counter stages, each having inputs connected to the data bus and outputs connected to the multiplexer, and further comprising:

a plurality of decoders, each having an input connected to the address bus and an output coupled to a respective one of the counter stages; and a logic circuit having input connections to the decoders and the processor and having output connections to the counters and the multiplexer.

29. A data processing system as recited in claim 28, wherein the logic circuit comprises:

a plurality of logic gates, each having a first input coupled to a respective decoder output, a second input coupled to write enable output of the processor, and an output connected to a respective counter.

30. A data processing system as recited in claim 28, wherein the logic circuit comprises a logic gate having a first input coupled to one of the decoder outputs, a second input coupled to a read enable output of the processor, and an output coupled to the multiplexer for application of a read control signal thereto.

31. A data processing system as recited in claim 30, wherein the logic circuit further comprises a pulse delay circuit having an input coupled to the read enable output of the processor and an output connected to the counter for incrementing the counter at a predetermined time after the counter output is applied to the ROM in the sequential address access mode.

* * * * *